US012659166B2

(12) United States Patent
Freer

(10) Patent No.: US 12,659,166 B2
(45) Date of Patent: Jun. 16, 2026

(54) BIOSECURITY CONTROL SYSTEM BASED ON BLOCKCHAIN TECHNOLOGY FOR REGULATION AND MONITORING THE PRINTING OF GENETIC SEQUENCES

(71) Applicant: Prepaire Labs Limited, Abu Dhabi (AE)

(72) Inventor: Carl Freer, Abu Dhabi (AE)

(73) Assignee: Prepaire Labs Limited, Abu Dhabi (AE)

( * ) Notice: Subject to any disclaimer, the term of this patent is extended or adjusted under 35 U.S.C. 154(b) by 0 days.

(21) Appl. No.: 18/742,265

(22) Filed: Jun. 13, 2024

(65) Prior Publication Data

US 2025/0150279 A1 May 8, 2025

Related U.S. Application Data

(60) Provisional application No. 63/629,984, filed on Jun. 13, 2023.

(51) Int. Cl.
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
CPC ......... G06F 21/31; G06F 21/64; G16B 50/40; G16B 40/20; H04L 9/50; H04L 9/3239; H04L 9/3297
See application file for complete search history.

(56) References Cited

U.S. PATENT DOCUMENTS

| | | | |
|---|---|---|---|
| 2019/0101896 A1* | 4/2019 | Cantrell | .............. G05B 19/4155 |
| 2019/0373137 A1 | 12/2019 | Krukar et al. | |
| 2022/0365511 A1 | 11/2022 | Perez et al. | |

(Continued)

FOREIGN PATENT DOCUMENTS

WO WO-2024/256875 A1 12/2024

OTHER PUBLICATIONS

International Search Report and Written Opinion for International Application No. PCT/IB24/00431 dated Nov. 27, 2024.

(Continued)

*Primary Examiner* — Olugbenga O Idowu

(74) *Attorney, Agent, or Firm* — Foley Hoag LLP; Lucas P. Watkins; David S. Surry

(57) ABSTRACT

A method comprising receiving a transaction request to print a genetic sequence, the transaction request including an account and a key, a state of the account managed by a blockchain where a plurality of copies of the blockchain include a state of the account; retrieving a stored key associated with the account; authenticating the transaction request based on the stored key and the transaction request key; determining a state of the account in a first copy of the blockchain is the same as in at least a second copy of the blockchain; validating the transaction request based on the determining a state of the account in a first copy of the plurality of copies of the blockchain is the same as in at least a second copy of the plurality of copies of the blockchain; and authorizing the transaction request based on the authentication and validation of the transaction request.

20 Claims, 3 Drawing Sheets

(56)                     References Cited

U.S. PATENT DOCUMENTS

2022/0375013 A1* 11/2022 Chijik .................. G06Q 50/184
2022/0405352 A1   12/2022 Such Vicente et al.

OTHER PUBLICATIONS

Kobokovich et al., "Strengthening security for gene synthesis: recommendations for governance," Health Security 17.6 (2019): 419-429.
Ozercan et al., "Realizing the potential of blockchain technologies in genomics," Genome Research 28.9 (2018): 1255-1263.
Kitney et al., "Build a sustainable vaccines industry with synthetic biology," Trends in Biotechnology 39.9 (2021): 866-874.

* cited by examiner

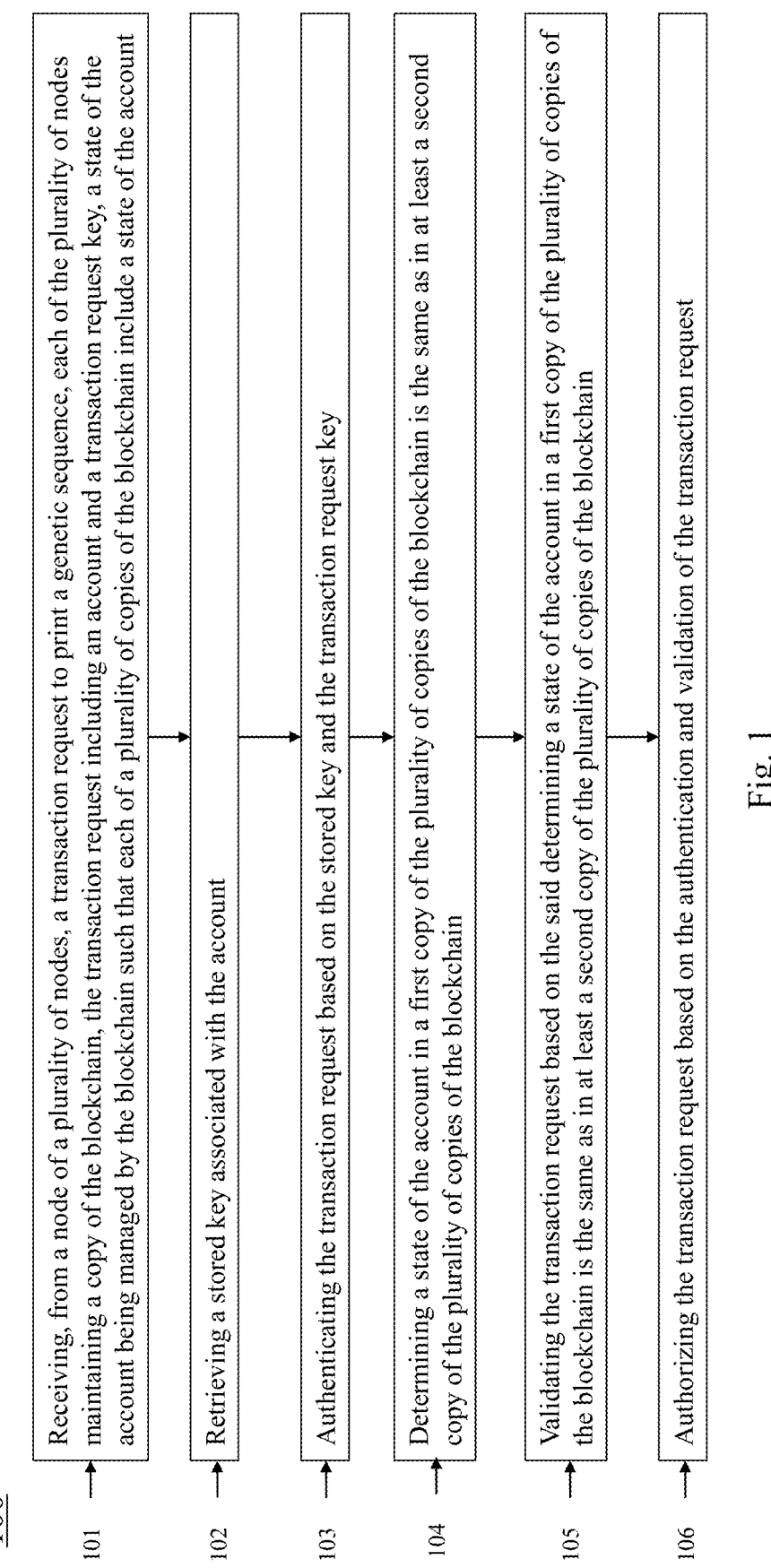

100

101   Receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain include a state of the account 102   Retrieving a stored key associated with the account 103   Authenticating the transaction request based on the stored key and the transaction request key 104   Determining a state of the account in a first copy of the plurality of copies of the blockchain is the same as in at least a second copy of the plurality of copies of the blockchain 105   Validating the transaction request based on the said determining a state of the account in a first copy of the plurality of copies of the blockchain is the same as in at least a second copy of the plurality of copies of the blockchain 106   Authorizing the transaction request based on the authentication and validation of the transaction request

Fig. 1

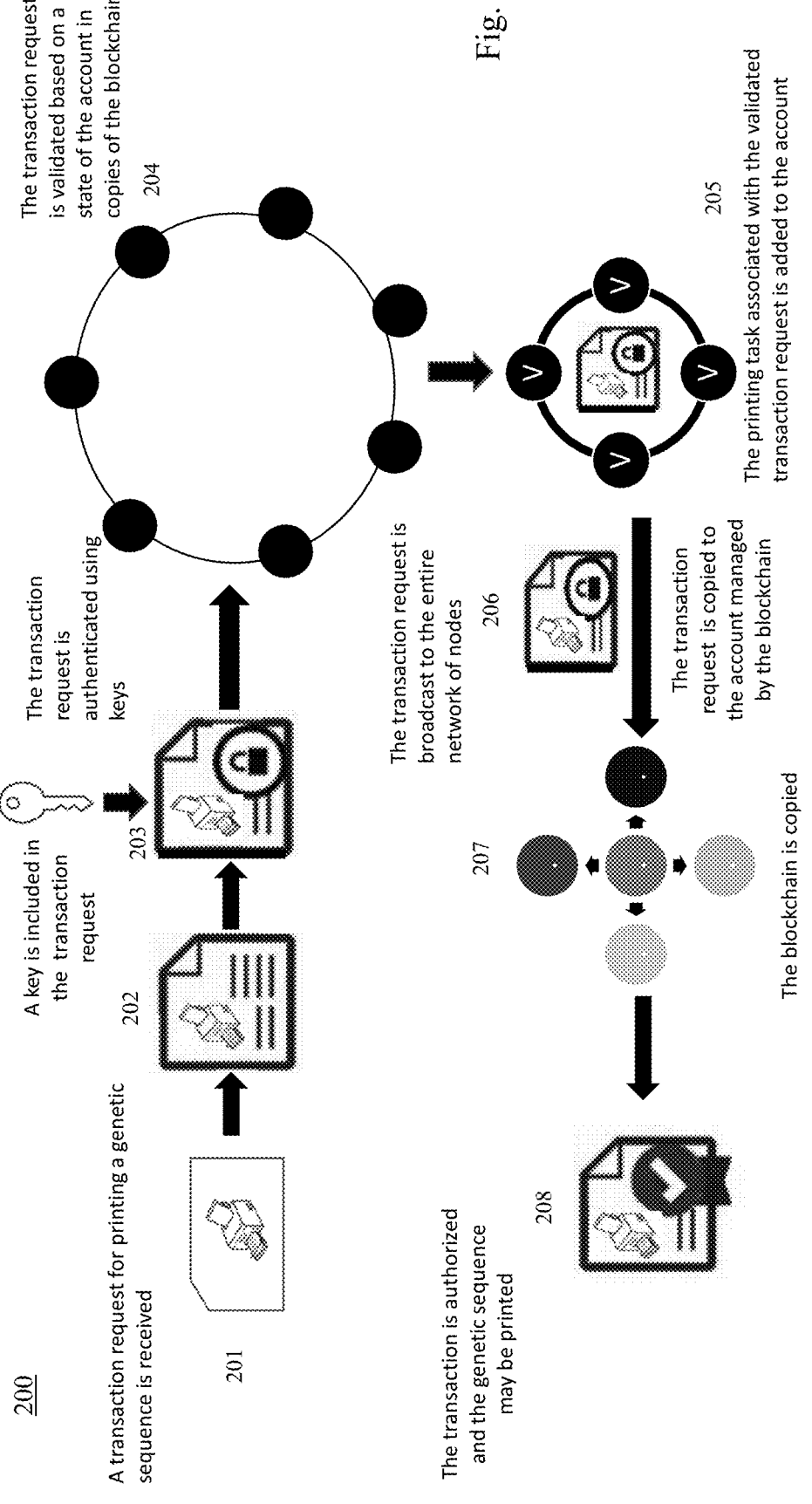

A transaction request for printing a genetic sequence is received

201

A key is included in the transaction request

202

203

The transaction request is authenticated using keys

The transaction request is validated based on a state of the account in copies of the blockchain.

204

The printing task associated with the validated transaction request is added to the account

205

The transaction request is broadcast to the entire network of nodes

206

The transaction request is copied to the account managed by the blockchain

207

The blockchain is copied

The transaction is authorized and the genetic sequence may be printed

208

BIOSECURITY CONTROL SYSTEM BASED ON BLOCKCHAIN TECHNOLOGY FOR REGULATION AND MONITORING THE PRINTING OF GENETIC SEQUENCES

RELATED APPLICATION(S)

This application claims the benefit of priority to U.S. Provisional Patent App. No. 63/629,984, filed Jun. 13, 2023, which is incorporated herein by reference in its entirety.

TECHNICAL FIELD

Embodiments of the present disclosure are related to a system, method, and computer program product for a blockchain technology used for regulating and monitoring DNA printing processes.

BACKGROUND OF THE DISCLOSURE

Printing genetic sequences, and the technology allowing for such printing, continues to boom. One of the most popular aspects in this area is a DNA printing process. The DNA printing process is based on plant and animal genomes, sequenced in computerized sequencers using gel electrophoresis technology. Sequences are translated from genetic code into computer code, uploaded to cloud databases (known as the "Internet of DNA") for storage and analysis, then designed in silica using CAD software. Laboratories may then download digital "gene of interest" DNA segments for chemical assembly of an artificial DNA strand that may be fused with a bacterial plasmid (a replicating non-chromosomal DNA segment) to become an rDNA molecule cloning and expression vector (carrying agent). The rDNA is inserted into a host *E. coli* bacterium that reproduces exponentially through binary fission to amplify the original downloaded genetic fragment as individual DNA clones in a colony capable of production of large quantities of the original target gene to manufacture "protein of interest" products encoded by that gene.

SUMMARY

Systems and methods directed towards the use of blockchain security in printing genetic sequence.

In an embodiment, a method of securely printing a genetic sequence using a blockchain comprises receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain include a state of the account; retrieving a stored key associated with the account; authenticating the transaction request based on the stored key and the transaction request key; determining a state of the account in a first copy of the plurality of copies of the blockchain is the same as in at least a second copy of the plurality of copies of the blockchain; validating the transaction request based on the said determining a state of the account in a first copy of the plurality of copies of the blockchain is the same as in at least a second copy of the plurality of copies of the blockchain; and authorizing the transaction request based on the authentication and validation of the transaction request.

In some embodiments, authenticating the transaction request comprises an asymmetric key cryptographic process to decrypt the transaction request.

In some embodiments, the plurality of nodes comprise an authorized network of nodes associated with the blockchain.

In some embodiments, the node in the network of authorized nodes is associated with a biological printer in the network.

In some embodiments, the transaction request is received at a different node from a node sending the transaction request, the different node within the authorized network of nodes and corresponding to a biological printer.

In some embodiments, each node in the authorized network of nodes is connected via a network interface.

In some embodiments, the transaction request is communicated via the network interface to the authorized network of nodes.

In some embodiments, the account is one of a plurality of accounts being managed by the blockchain, and wherein each of the plurality of accounts is associated with a node in the authorized network of nodes. In some embodiments, the state of the account comprises a status of each transaction request in the record of transaction requests to print the genetic sequence.

In some embodiments, the account comprises at least one record of one or more authorized transaction requests.

In some embodiments, the state of the account comprises an accounting of each of the one or more authorized transaction requests.

In some embodiments, the method further comprises the state of the account comprises an accounting of each of the one or more authorized transaction requests.

In some embodiments, the method further comprises adding the transaction request to the at least one record of the one or more authorized transaction requests in the account.

In some embodiments, the account is accessible by a user of node in the plurality of nodes.

In some embodiments, the transaction request includes one or more of a printing task, an account identifier, the genetic sequence, a timestamp corresponding to a time of the transaction request, a printer identifier, and the transaction request key.

In an alternative embodiment, a system comprises a computing node corresponding to a biological printer, comprising a computer readable storage medium having program instructions embodied therewith, the program instructions executable by a processor of the computing node to cause the processor to perform a method comprising: receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain include a state of the account; retrieving a stored key associated with the account; authenticating the transaction request based on the stored key and the transaction request key; determining a state of the account in a first copy of the plurality of copies of the blockchain is the same as in at least a second copy of the plurality of copies of the blockchain; validating the transaction request based on the said determining a state of the account in a first copy of the plurality of copies of the blockchain is the same as in at least a second copy of the plurality of copies of the blockchain; and authorizing the transaction request based on the authentication and validation of the transaction request.

In an alternative embodiment, a computer program product comprises a computer readable storage medium having program instructions embodied therewith, the program instructions executable by a processor to cause the processor to perform a method comprising: receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain include a state of the account; retrieving a stored key associated with the account; authenticating the transaction request based on the stored key and the transaction request key; determining a state of the account in a first copy of the plurality of copies of the blockchain is the same as in at least a second copy of the plurality of copies of the blockchain; validating the transaction request based on the said determining a state of the account in a first copy of the plurality of copies of the blockchain is the same as in at least a second copy of the plurality of copies of the blockchain; and authorizing the transaction request based on the authentication and validation of the transaction request.

BRIEF DESCRIPTION OF THE DRAWINGS

The accompanying drawings, which are incorporated into and constitute a part of this specification, illustrate various exemplary embodiments and together with the description, serve to explain the principles of the disclosed embodiments.

FIG. 1 is a process diagram illustrating a method for securely printing a genetic sequence using a blockchain, in accordance with one or more embodiments of this disclosure.

FIG. 2 is a diagram illustrating a process of adding a transaction request, corresponding to a genetic sequence printing task, to a blockchain, in accordance with one or more embodiments of this disclosure.

DETAILED DESCRIPTION

Figure 3:
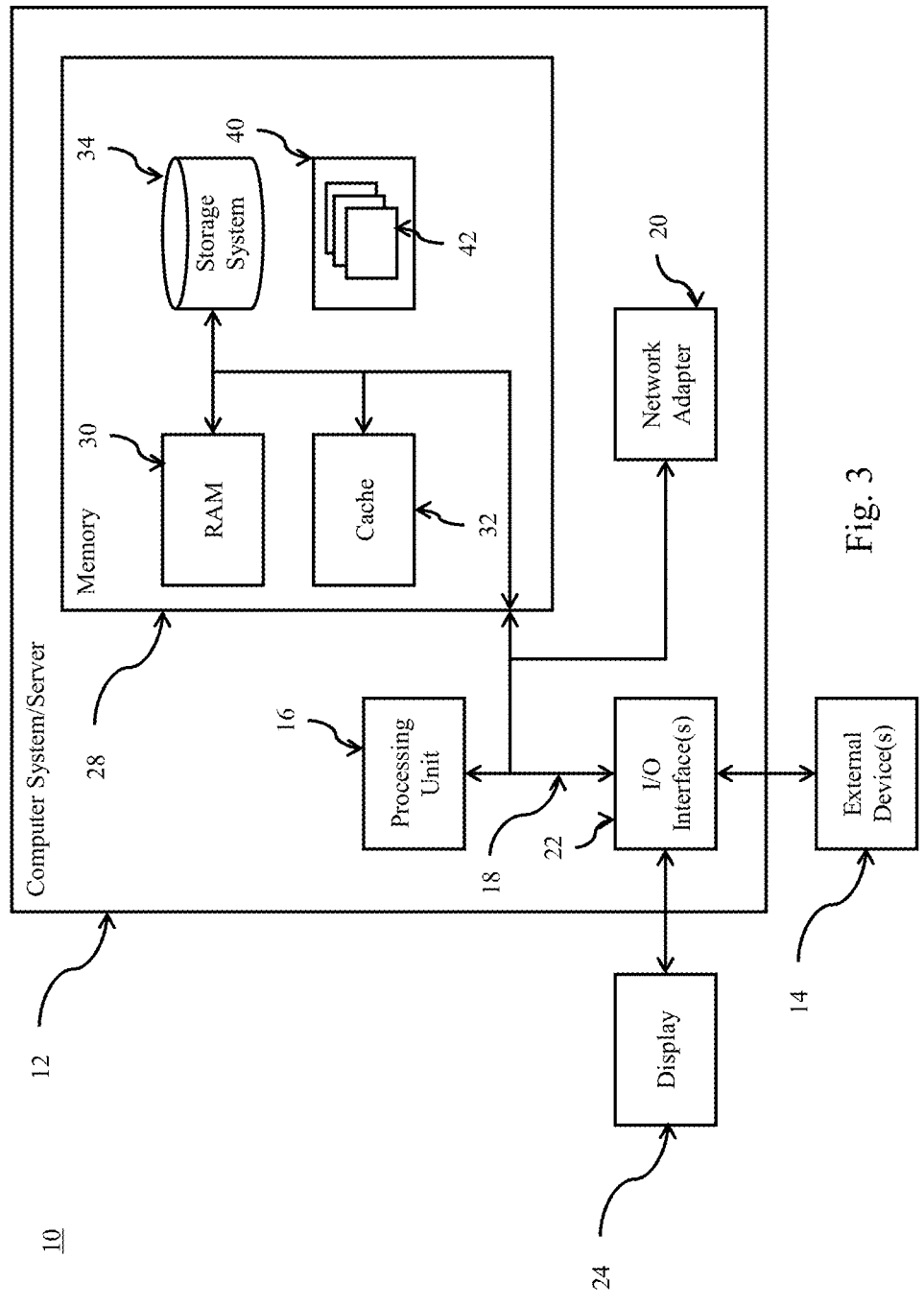
FIG. 3 is an exemplary computing node.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

For any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used in this application, the terms "system" and "component" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As used herein, the term "exemplary" is used in the sense of "example," rather than "ideal." Moreover, the terms "a" and "an" herein do not denote a limitation of quantity, but rather denote the presence of one or more of the referenced items.

DNA printing is based on the natural flow of genetic information in a cell from DNA through RNA to amino acids to proteins, from gene to protein, genome to proteome, genomics to proteomics. DNA makes up genes, the instructions for making proteins—the complex molecules responsible for doing the work in living organisms. DNA printing is the essential component in synthetic biology, allowing scientists to acquire custom oligos (short, single-stranded DNA sequences) to develop PCR diagnostics (primers and probes), gene synthesis and editing technologies, and many other molecular biology and genomics applications.

Synthetic DNA supports vaccine and therapy development, as well as data storage, bioremediation, clean meat production and bio-renewable petroleum alternatives, among a plethora of synthetic biology applications. Until recently, synthetic DNA was made solely using a phosphoramidite chemistry process, which relies on highly trained chemists, tight environmental controls, toxic reagents and produces hazardous organic waste.

To meet the demands associated with creating a synthetic DNA ecosystem, laboratories have outsourced custom oligo production to third-party vendors. Effectively, this results in workflows that must accommodate timelines dictated by delivery schedules, thereby limiting productivity and slowing innovation.

Enzymatic DNA synthesis (EDS) emulates how cells synthesize their own genetic material. As a result, the DNA writing process relies on enzymes and a water-based environment, making it a much cleaner, more environmentally friendly, sustainable process. Equally important, EDS sets the stage for easy-to-use, safe and automated benchtop DNA printing instruments meet oligo needs in a lab setting, printing needed DNA on demand, in-house, and with high fidelity and confidentiality.

Accordingly, embodiments of the present disclosure include system and methods designed to regulate and monitor the printing of genetic sequences and establish a secure and transparent method for managing permissions for genetic sequence and ensures that the stored information cannot be altered or deleted and is readily available for audit and review.

Embodiments of the present disclosure pertain to a novel biosecurity control system based on blockchain technology and designed to regulate and monitor the printing of genetic sequences. The system integrates distributed ledger technology to establish a secure and transparent method for managing permissions for genetic sequence printing tasks, thus significantly enhancing biosecurity measures. The blockchain system stores immutable records of all authorized printing tasks, including the details of the genetic sequences, the verified parties involved, the timestamps, and the granted permissions. The secure nature of the blockchain ensures that stored information cannot be altered or deleted and is readily available for audit and review.

Some embodiments of the present disclosure provide a novel biosecurity control system to prevent unauthorized printing tasks, wherein without a corresponding record of permission on the blockchain, verified and approved by an authorized party, the printer will not initiate the genetic sequence printing process.

Some embodiments of the present disclosure provide the novel biosecurity control system as an effective deterrent against unregulated and potentially hazardous genetic sequence printing.

Some embodiments of the present disclosure provide the novel biosecurity control system using blockchain technology to establish an reliable and secure approach for managing and regulating genetic sequence printing, thereby fostering a safer bioengineering environment.

Some embodiments of the present disclosure provide the novel biosecurity control system using blockchain technology to establish a blockchain ledger for biological printers. This approach may offer numerous advantages, including but not limited to enhanced security, transparency, and traceability by leveraging blockchain technology. Accordingly, the biological printing can promote trust, efficiency, and quality control in this innovative field.

Some embodiments of the present disclosure may pertain to a novel biosecurity control system based on blockchain technology designed to regulate and monitor the printing of genetic sequences. The system integrates the principle of distributed ledger technology to establish a secure and transparent method for managing permissions for genetic sequence printing tasks, thus significantly enhancing biosecurity measures. The blockchain system stores immutable records of all authorized printing tasks, including the details of the genetic sequences, the verified parties involved, the timestamps, and the granted permissions. Accounts within the blockchain system keep track of printing tasks, and each account is associated with a user requesting the printing task. Each account has a corresponding state, wherein the state of the account may include the number of requested printing tasks to be performed via that account as well as the status of each requested printing task (e.g., the percentage of the task that is completed or to be completed, or a textual indicator related to task completion). The secure nature of the blockchain ensures that the stored information cannot be altered or deleted and is readily available for audit and review. This system may prevent unauthorized printing tasks. Without a corresponding record of permission on the blockchain, verified and approved by an authorized party, the printer will not initiate the genetic sequence printing process. This serves as an effective deterrent against unregulated and potentially hazardous genetic sequence printing. In essence, this blockchain-based biosecurity control system establishes an innovative, reliable, and secure approach for managing and regulating genetic sequence printing, thereby fostering a safer bioengineering environment.

In some embodiments, the biosecurity control system based on blockchain technology includes a central authority coupled via network to one or more merchant devices, such as printing devices. Each merchant device is communicatively coupled via blockchain with the manufacturer of the printing devices. The network is also connected to any authority such as state, local, and federal government. A client that may order a job to be printed by the printing devices can be anybody, including a bad actor, including criminals, terrorists, or producer of human organs or toxic substances.

In some embodiments, the biosecurity control system based on blockchain technology provides verification, for example, where every transaction that is ready to be printed by the customer is verified by the manufacturer of printing machine and confirmed with the authority before the printing is allowed to take place.

For the purposes herein, the term "communicatively coupled" means that each device includes communication and interface logic that enables the devices to exchange blockchain messages and other information. The logic may provide for either or both of direct coupling of the member device and the merchant (i.e., a card reader or the like), and/or may include logic for communicating over a network, such as a wireless or Bluetooth network. FIG. 1 is an exemplary process diagram 100 illustrating a method of for requesting a transaction. In some embodiments, the steps of diagram 100 may be performed by a biological printer or a corresponding node, which may be communicatively coupled to nodes in a blockchain network or authorized entities within the blockchain network. In some embodiments, the printer may be considered to be a node in the blockchain network. At step 101, the method may include receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain include a state of the account. The account may include a number of printing tasks requested, and is associated with a user making the printing request. In some embodiments, the transaction request may include a printing task. The transaction request and/or the printing task may include an account identifier, a printer identifier, such as a name or a number associated with the printer, the parties involved in the printing task, the genetic sequence to be printed and/or any details of a genetic sequence to be printed, a cryptographic transaction request key, such as a public key associated with the printer and/or an account, timestamps associated with a time of the transaction request, and/or the like. In some embodiments, the blockchain may manage accounts, the state of the accounts, and immutable records of all authorized transaction requests and/or printing tasks. In some embodiments, the plurality of nodes comprises an authorized network of nodes associated with the blockchain. In some embodiments, each node in the network of authorized nodes is associated with a biological printer in the network. In some embodiments, the transaction request is received at a different node from a node sending the transaction request, the different node within the authorized network of nodes and corresponding to a biological printer.

In some embodiments, each node in the authorized network of nodes is connected via a network interface. In some embodiments, the transaction request is communicated via the network interface to the authorized network of nodes. In some embodiments, the account is one of a plurality of accounts being managed by the blockchain, and wherein each of the plurality of accounts is associated with a node in the authorized network of nodes. In some embodiments, the account comprises at least one record of one or more authorized transaction requests. In some embodiments, the account is accessible by a user of node in the plurality of nodes.

At step 102, the method may include retrieving a stored key associated with the account. The key may be included in the transaction request. In some embodiments, the key may be a public key.

At step 103, the method may include authenticating the transaction request based on the stored key and the transaction request key. Authentication may be done by a comparison of keys, an asymmetric key cryptographic process, and/or by decryption of the transaction request.

At step 104, the method may include determining a state of the account in a first copy of the plurality of copies of the blockchain is the same as in at least a second copy of the plurality of copies of the blockchain. In some embodiments, the account comprises at least one record of one or more authorized transaction requests. In some embodiments, the state of the account comprises an accounting of each of the one or more authorized transaction requests.

At step 105, the method may include validating the transaction request based on the said determining a state of the account in a first copy of the plurality of copies of the blockchain is the same as in at least a second copy of the plurality of copies of the blockchain.

At step 106, the method may include authorizing the transaction request based on the authentication and validation of the transaction request. In some embodiments, the method 100 further comprises allowing a biological printer associated with the node in the authorized network to print the genetic sequence information. In some embodiments, the method 100 further comprises adding the transaction request to the at least one record of the one or more authorized transaction requests in the account. As a result of the authorization of the transaction request, the biological printer prints the genetic sequence.

FIG. 2 is a diagram 200 illustrating a process of adding a transaction request, corresponding to a genetic sequence printing task, to a blockchain. In diagram 200, a transaction request may be made by a user at step 201. The transaction request, for example, may be for a genetic sequence to be printed. The transaction request may then e received at a node associated with a biological printer, as shown at step 202. At step 203, a key included in the transaction request (such as, for example, a public key) may be used to authenticate the transaction request. In particular, the key included in the transaction request may be used together with another key (such as, for example, a private key), stored at the biological printer or corresponding node, to perform the authentication. For example, the authentication may comprise decrypting the transaction request using techniques associated with asymmetric key cryptography. At step 204, the transaction request may be validated by determining that a state of an account in a first copy of the blockchain is the same in at least a second copy of the blockchain. The size of the blockchain may be too large and involve too many transaction requests for the human mind. The blockchain is a data structure requiring a number of printing tasks that are too numerous for the human mind to comprehend. The account may be associated with a user, such that the account comprises at least one record of one or more authorized transaction requests. In some embodiments, the state of the account may include an accounting of each of the one or more authorized transaction requests. The account may be one of a plurality of accounts being managed by the blockchain. Each of the plurality of accounts may be associated with a node in the authorized network of nodes. In some embodiments, the account comprises at least one record of one or more authorized transaction requests. In some embodiments, the account is accessible by a user of node in the plurality of nodes. As shown, the blockchain network may be involved in the validation process. The transaction request may be communicated to an entire network of nodes. The entire network of nodes may include all nodes associated with the blockchain. In step 205, the validated request may be added to the blockchain, and to the accounting of each of the one or more authorized transaction requests. Thereafter, the transaction may be copied, through a process such as synchronization, to each account, throughout the network of nodes, managed by copies of the distributed blockchain, as shown in steps 206 and 207. Finally, in step 208, the transaction may be authorized based on the authentication and validation of the transaction request, and the genetic sequence may be printed. It is contemplated that the steps 201-208 may be performed in a different order, or suitably altered in some embodiments.

While embodiments of the present disclosure are directed towards the use of blockchain, it is conceivable that some embodiments may also include the use of smart contracts. For example, smart contracts may be used to vet transaction requests, such that each request must pass a check prior to entering the blockchain environment. Alternatively, it is contemplated that each genetic sequence printing request is automated or analyzed by the smart contract to ensure compliance with printer manufacturer or other guidelines. Smart contracts are self-executing contracts that use blockchain technology to automate the execution of contract terms. To compare, blockchain technology is a decentralized digital ledger that records transactions securely and transparently. Smart contracts are designed to automate the process of contract execution, ensuring that contractual terms are met without the need for intermediaries. Large language models, for example, ChatGPT, may include AI capabilities able to automate and optimize smart contract execution in several ways. As an example, ChatGPT's AI capabilities can enhance the accuracy and efficiency of smart contract execution, improve smart contract coding, enhance blockchain security, and aid in analyzing and interpreting large amounts of data for blockchain applications.

Smart contracts are coded using programming languages such as Solidity, which is specifically designed for writing smart contracts on blockchain platforms such as Ethereum. Other programming languages, such as Python, JavaScript, and C++, can also be used for smart contract coding. However, coding smart contracts can be complex and error-prone, as even small mistakes in the code can have significant consequences. With large language models and the associated AI systems, developers can write smart contract code in natural language, which can help reduce errors and improve the efficiency of the coding process.

These large language models can be used to streamline the process of contract creation by assisting in the development and testing of smart contract codes. For example, it is contemplated that models such as ChatGPT can help developers write more efficient and error-free code, reducing the likelihood of bugs and other issues.

The AI systems associated with these models can be used to automate the process of contract execution. By analyzing and interpreting the data generated by smart contracts, potential issues or errors in the contract code may be identified, alerting developers to take corrective action. This can reduce the time and effort required to manually monitor smart contracts, improving the speed and accuracy of contract execution.

Further, AI capabilities can optimize smart contract performance by analyzing contract data and identifying patterns and trends. This can help improve the efficiency of contract execution by identifying areas where the contract can be optimized, such as reducing gas fees or improving the execution speed.

Enhancing blockchain security with a large language model's ability for advanced threat detection and prevention may provide additional advantages in a genetic sequence printing process. While blockchain technology has emerged as a highly secure and transparent way to store and transfer digital assets, it is not immune to security threats. Some common security threats facing blockchain technology include hacking and cyberattacks, insider threats, and 51% attacks. Large language models and their associated AI systems can help prevent and mitigate these threats in a number of ways. For example, ChatGPT can analyze network traffic and detect unusual activity, such as suspicious transactions or attempted hacks. It can also monitor social media and other sources to identify potential threats, such as discussions of vulnerabilities or attacks. Additionally, large language models can use machine learning to identify patterns of behavior that may indicate an insider threat and alert administrators to take action.

Blockchain technology can be used for biological supply chain tracking and other data-intensive applications. By creating an immutable, decentralized ledger of transactions, blockchain allows for secure and transparent tracking of base compounds. For example, in the supply chain industry, blockchain technology can track the movement of goods from the point of origin to the final destination. This generates a huge amount of data, including information about product quality, shipping times, and inventory levels. Large language models and associated AI systems can analyze this data, identify patterns and trends, and provide real-time insights that can help optimize supply chain operations. By streamlining and automating smart contract execution, enhancing smart contract coding accuracy and efficiency, improving blockchain security, and enhancing blockchain data analysis, supply chain operations may be significantly improved by the incorporation of large language models and AI.

Embodiments of the present disclosure are contemplated to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Referring now to FIG. 3, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example embodiments of the invention are defined by the following numbered embodiments:

1:

A biosecurity control system based on blockchain technology designed to regulate and monitor the printing of genetic sequences, the biosecurity control system, comprising:

an authorized network of nodes comprising a plurality of nodes and a plurality of printing devices for printing of genetic sequences, wherein each of the nodes is associated with at least one account, and a state of each account of each node is managed by a blockchain such that copies of each blockchain are maintained by at least a portion of the plurality of nodes and printing devices;

a printing device of the plurality of printing devices comprising a network interface coupled with the authorized network of nodes, storage, memory, and at least one processor coupled with the network interface, the storage, and the memory, and the storage to store a first copy of the blockchain; the at least one processor configured to execute instructions stored in the memory, that when executed, cause the at least one processor to: receive, via the network interface, a transaction request from a node of the plurality of nodes, the transaction request including a blockchain message including a key, an account balance of an account associated with the node and maintained in a second copy of the blockchain on the node, and a transaction value;

retrieve, from the storage, a stored key associated with the account; authenticate the transaction request using the first copy of the blockchain by comparing the key against the stored key associated with the account;

determine the first copy of the blockchain and the second copy of the blockchain are synchronized based on the account balance;

validate the transaction request based on the first copy of the blockchain and the second copy of the blockchain determined to be synchronized; and authorize the transaction request in response to the transaction request based on the transaction request being authenticated and validated.

2:

The biosecurity control system as set forth in embodiment 1, comprising the processor to:

store a plurality of transactions in the storage of the printing device; and periodically cause, via a network interface, communication of the plurality of transactions to a central authority server to update the blockchain

3:

The biosecurity control system as set forth in embodiment 2, wherein the processor is configured to periodically cause, via the network interface, communication of the plurality of transactions to at least a portion of the nodes and the printing devices.

4:

The biosecurity control system as set forth in embodiment 1, wherein validate the transaction request further comprises the processor to determine the printing device is permitted to release the information.

5:

The biosecurity control system as set forth in embodiment 1, wherein validate the transaction request further comprises receiving one or more blockchain validation messages from corresponding one or more other nodes indicating the first copy of the blockchain and the second copy of the blockchain are synchronized.

6:

The biosecurity control system as set forth in embodiment 1, wherein the processor is configured to generate an updated block representing an updated state of the printing device of the node following the authorization and validation of the transaction request.

7:

The biosecurity control system as set forth in embodiment 1, wherein the processor is configured to reject the transaction when the transaction request cannot be authenticated, validated, or both.

What is claimed:

1. A method of securely printing a genetic sequence using a blockchain, comprising:

receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain include a state of the account;

retrieving a stored key associated with the account;

authenticating the transaction request based on the stored key and the transaction request key;

determining that a state of the account in a first copy of the plurality of copies of the blockchain is the same as in at least a second copy of the plurality of copies of the blockchain;

validating the transaction request based on the determining that the state of the account in a first copy of the plurality of copies of the blockchain is the same as in at least a second copy of the plurality of copies of the blockchain; and authorizing the transaction request based on the authentication and validation of the transaction request.

2. The method of claim 1, wherein authenticating the transaction request comprises using an asymmetric key cryptographic process to decrypt the transaction request.

3. The method of claim 1, wherein the plurality of nodes comprises an authorized network of nodes associated with the blockchain.

4. The method of claim 3, wherein each node in the network of authorized nodes is associated with a biological printer in the network.

5. The method of claim 3, wherein the transaction request is received at a different node from a node sending the transaction request, the different node within the authorized network of nodes and corresponding to a biological printer.

6. The method of claim 3, wherein each node in the authorized network of nodes is connected via a network interface.

7. The method of claim 6, wherein the transaction request is communicated via the network interface to a central authority server of the authorized network of nodes.

8. The method of claim 3, wherein the account is one of a plurality of accounts being managed by the blockchain, and wherein each of the plurality of accounts is associated with a node in the authorized network of nodes.

9. The method of claim 1, wherein the account comprises at least one record of one or more authorized transaction requests.

10. The method of claim 9, wherein the state of the account comprises an accounting of each of the one or more authorized transaction requests.

11. The method of claim 1, further comprising allowing a biological printer associated with the node in the authorized network to print the genetic sequence information.

12. The method of claim 9, further comprising adding the transaction request to the at least one record of the one or more authorized transaction requests in the account.

13. The method of claim 1, wherein the account is accessible by a user of node in the plurality of nodes.

14. The method of claim 1, wherein the transaction request includes one or more of a printing task, an account identifier, the genetic sequence, a timestamp corresponding to a time of the transaction request, a printer identifier, and the transaction request key.

15. The method of claim 1, wherein the state of the account includes a status of one or more printing tasks.

16. A system comprising:

a computing node within a plurality of nodes, comprising a computer readable storage medium having program instructions embodied therewith, the program instructions executable by a processor of the computing node to cause the processor to perform a method comprising:

receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain includes a state of the account;

retrieving a stored key associated with the account;

authenticating the transaction request based on the stored key and the transaction request key;

determining a state of the account in a first copy of the plurality of copies of the blockchain is the same as in at least a second copy of the plurality of copies of the blockchain;

validating the transaction request based on the said determining a state of the account in a first copy of the plurality of copies of the blockchain is the same as in at least a second copy of the plurality of copies of the blockchain; and authorizing the transaction request based on the authentication and validation of the transaction request.

17. The system of claim 16, wherein authenticating the transaction request comprises an asymmetric key cryptographic process to decrypt the transaction request.

18. The system of claim 17, wherein the plurality of nodes comprises an authorized network of nodes associated with the blockchain.

19. The system of claim 17, wherein each node in the network of authorized nodes is associated with a biological printer in the network.

20. A computer program product, the computer program product comprising a computer readable storage medium having program instructions embodied therewith, the program instructions executable by a processor to cause the processor to perform a method comprising:

receiving, from a node of a plurality of nodes, a transaction request to print a genetic sequence, each of the plurality of nodes maintaining a copy of the blockchain, the transaction request including an account and a transaction request key, a state of the account being managed by the blockchain such that each of a plurality of copies of the blockchain includes a state of the account;

retrieving a stored key associated with the account;

authenticating the transaction request based on the stored key and the transaction request key;

determining a state of the account in a first copy of the plurality of copies of the blockchain is the same as in at least a second copy of the plurality of copies of the blockchain;

validating the transaction request based on the said determining a state of the account in a first copy of the plurality of copies of the blockchain is the same as in at least a second copy of the plurality of copies of the blockchain; and authorizing the transaction request based on the authentication and validation of the transaction request.

\* \* \* \* \*